United States Patent [19]

Pollard

[11] 4,366,014

[45] Dec. 28, 1982

[54] METHOD OF MAKING JOINTS IN BELTING

[75] Inventor: Ernest Pollard, Bingley, England

[73] Assignee: Pollard V-Belt (Guernsey) Limited, Guernsey, England

[21] Appl. No.: 251,655

[22] Filed: Apr. 6, 1981

[51] Int. Cl.$^3$ .............................................. B65B 13/02
[52] U.S. Cl. ................................. 156/157; 156/137; 156/196; 156/304.5; 156/304.6; 156/309.6; 156/309.9; 156/322; 156/502; 428/60
[58] Field of Search ............... 156/137, 157, 159, 196, 156/304.5, 304.6, 309.6, 309.9, 322, 499, 502, 304.2; 428/60; 474/254

[56] References Cited

U.S. PATENT DOCUMENTS

| | | | |
|---|---|---|---|
| 3,276,941 | 10/1966 | Burns | 156/304.6 |
| 3,368,323 | 2/1968 | Wood | 156/499 |
| 3,419,447 | 12/1968 | Hewitt | 156/304.6 |
| 3,558,390 | 1/1970 | Habegger | 156/137 |
| 3,616,024 | 10/1971 | Windle | 156/304.6 |
| 3,799,820 | 3/1974 | Sollerud | 156/309.6 |
| 3,919,034 | 11/1975 | Carini | 156/304.5 |
| 3,944,460 | 3/1976 | Karr | 156/499 |
| 4,010,655 | 3/1977 | Pollard | 474/254 |
| 4,177,100 | 12/1979 | Pennington | 156/304.6 |

Primary Examiner—Jerome W. Massie
Attorney, Agent, or Firm—John C. Smith, Jr.

[57] ABSTRACT

One belting end 12 is joined to an adjacent belting end 13 using the apparatus shown in FIG. 3. The belting comprises a body element and a longitudinally extending constraining element embedded in the body element.

The ends 12 and 13 are preferably shaped as shown in FIG. 4 and are pressed by the apparatus against opposite faces of a heating element 21. The application of heat and pressure causes the ends of the constraining element to be displaced transversely with respect to their associated body elements, the displacement of one end taking place in the opposite direction to the displacement of the other end so that in the finished joint the ends of the constraining element form an overlapping joint embedded in the fused material of the body element.

11 Claims, 5 Drawing Figures

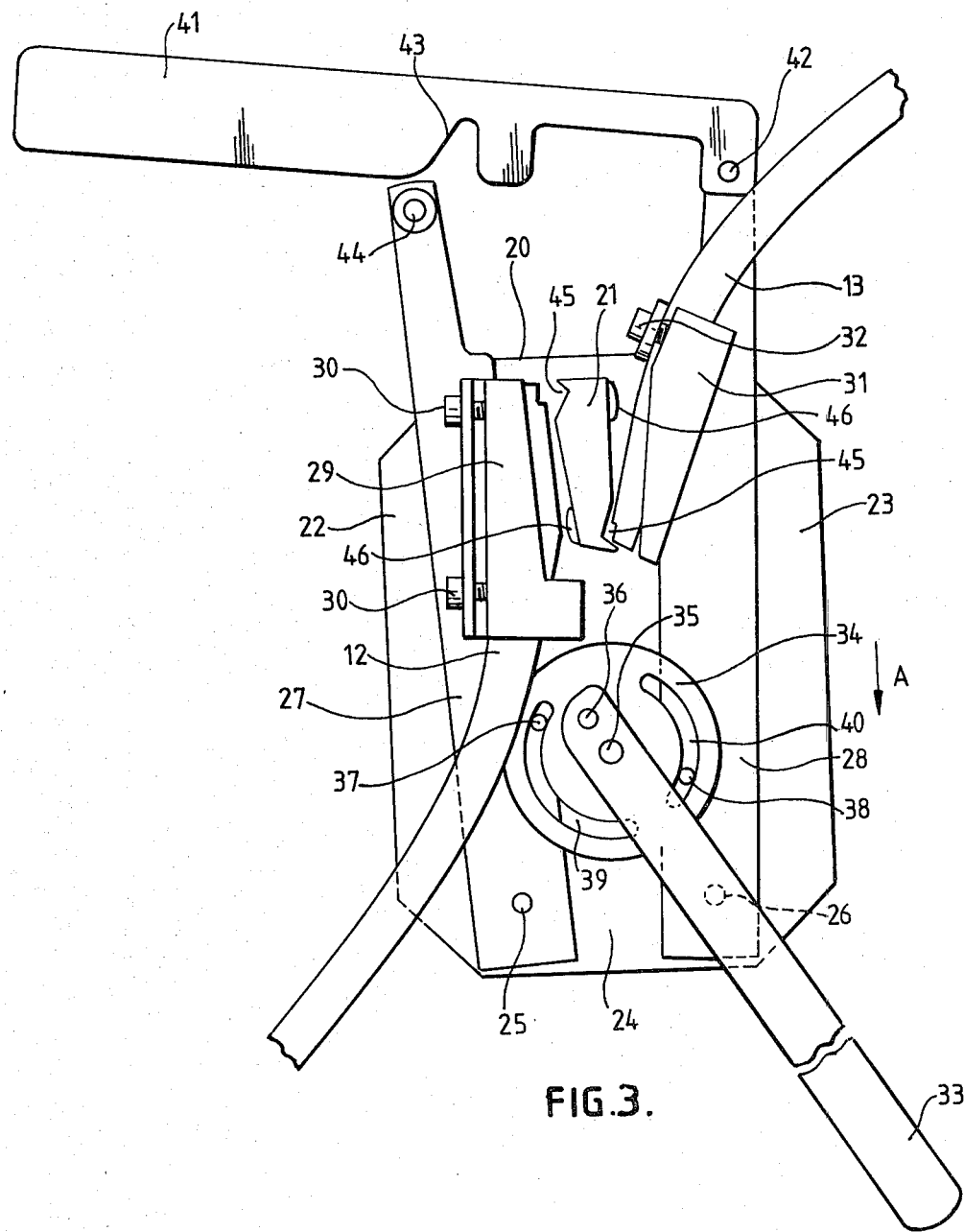

METHOD OF MAKING JOINTS IN BELTING

The invention relates to joints, and particularly to joints between the ends of belting.

Belting is known comprising an elongate body element and a longitudinally extending constraining element embedded in the body element. Examples of this form of belting are described in British Pat. No. 1425462.

Difficulties have been encountered in joining together the ends of such belting, for example to form continuous drive belts, and all the known forms of joining the ends have resulted in a belt in which the joint is considerably weaker than the rest of the belt.

The invention provides a method of forming a joint between adjacent ends of belting, the belting comprising a body element and a longitudinally extending constraining element embedded in the body element, the method comprising the application of heat and pressure to the adjacent ends such that the ends of the body element are fused together, the application of heat and pressure causing the ends of the constraining element to be displaced transversely with respect to their associated body elements, the displacement of one end taking place in the opposite direction to the displacement of the other end so that in the finished joint the ends of the constraining element form an overlapping joint embedded in the fused material of the body element.

Preferably the method is used to join together the two ends of a single length of belting to form a continuous belt, but the method may of course be used to join one length of belting to another length.

Preferably the adjacent ends of the belting each have heat and pressure applied to them by a hot member, to melt the body element and displace the constraining element transversely in the melted body element, and the two melted ends are then urged together to form the joint.

Preferably the hot member comprises an electrically heated element.

The method may be such that a face of the hot member engages each end of the belting at an angle inclined to the longitudinal axis of the belting, pressure against the face thus causing the displacement of each constraining element and causing each melted end of the body element to have a tapered configuration so that a scarf joint can be formed.

The method may be such that one end of the belting engages one face of the hot member and the other end of the belting engages the opposite face of the hot member.

Prior to engaging the ends of the belting with the hot member the ends may be cut to a tapered shape to facilitate the formation of tapered melted ends on the body element.

Prior to engaging the ends of the belting with the hot member part of each free end of the constraining element may be removed to reduce any risk that displacement of the constraining element will cause a free end to be exposed at the surface of the body element in the finished joint. This could lead to the joint cracking at the point where the constraining element is exposed.

The extremity of the tapered shape of each end of the belting may be formed into a blunt nose rather than a sharp edge so that when heat is applied there is a sufficient quantity of body element material in this region to fuse to the other end of the belting and further assist in preventing the constraining element from being exposed in the finished joint.

The hot member may be provided with a recess into which each blunt nose is forced to ensure that the end of each blunt nose is adequately melted.

The hot member may also be provided with a projection which forms a melted recess in each end of the body element to receive the melted blunt nose of the other end of the body element.

The invention includes apparatus for forming a joint between adjacent ends of belting, the belting comprising a body element and a longitudinally extending constraining element embedded in the body element, the apparatus comprising means for applying heat and pressure to the adjacent ends such that the ends of the body element are fused together, the application of the heat and pressure being such that the ends of the constraining element are displaced transversely with respect to their associated body elements, the displacement of one end taking place in the opposite direction to the displacement of the other end so that in the finished joint the ends of the constraining element form an overlapping joint embedded in the fused material of the body element.

The apparatus may have a hot member operable to apply heat and pressure to the adjacent ends of the belting, to melt each body element and displace each constraining element transversely in the melted body element, there being means to subsequently urge the two melted ends together to form the joint.

The hot member may comprise an electrically heated element.

The hot member may have a face to engage each end of the belting at an angle inclined to the longitudinal axis of the belting, pressure against the face thus causing the displacement of each constraining element and causing each melted end of the body element to have a tapered configuration so that a scarf joint can be formed.

The apparatus may have pressure means arranged to press one end of the belting against one face of the hot member while the other end of the belting is pressed against the opposite face of the hot member.

The pressure means may be movable, together with the belting, relative to the hot member such that the pressure means can subsequently be used to urge the two melted ends of the belting together.

The hot member may be provided with at least one recess arranged to receive and melt a blunt nose of an end of the belting.

The hot member may be provided with at least one projection arranged to melt a recess in at least one end of the belting to receive a blunt nose of the other end of the belting.

The invention includes belting when jointed together by the method according to the invention or by the apparatus according to the invention.

By way of example, a specific embodiment of the invention will now be described, with reference to the accompanying drawings, in which:

FIG. 3 is a plan view of the embodiment of apparatus according to the invention, showing the ends of the belting inserted therein;

Figure 1:
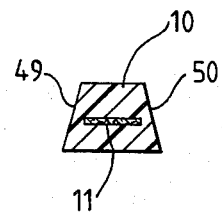
FIG. 1 is a transverse cross-section through a length of belting, the ends of which are to be joined by the described embodiment of apparatus and method according to the invention.

This embodiment of method and apparatus according to the invention will be particularly described with specific reference to belting of the form disclosed in British Pat. No. 1425462. The belting comprises an elongate body element 10 which is trapezoidal in transverse cross-section as shown in FIG. 1. Embedded in the body element 10 is a constraining element 11 in the form of a woven tape. This resists any tendency of the belting to stretch longitudinally.

Figure 2:
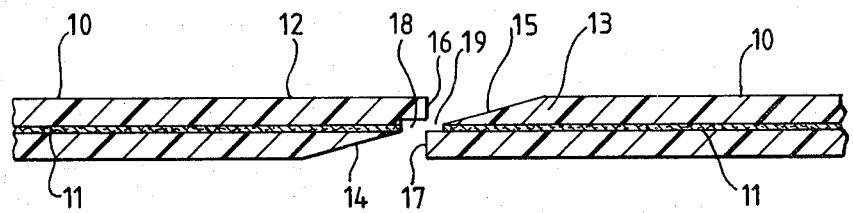
FIG. 2 is a longitudinal cross-section through the belting showing the two ends of the belting prepared for joining.

In order to join the ends 12 and 13, they are first cut to the shape shown in FIG. 2. Each end is first tapered as shown at 14 and 15 but the taper has a blunt nose as shown at 16 and 17 and the free ends of the constraining element are cut away at 18 and 19 so that the noses 16 and 17 project beyond the ends of the associated constraining element.

The ends 12 and 13 are then placed in the apparatus shown in plan view in FIG. 3. The apparatus has a body 20 from which an electrical heating element 21 projects upwardly. A generally U-shaped plate is slidably mounted on the top of the body 20, the plate having arms 22 and 23, one on each side of the element 21, the arms being interconnected by a transverse portion 24. The plate can slide with respect to the body 20 in the direction of arrow A.

Pivotally mounted on the plate, by means of pivot pins 25 and 26, there are two arms 27 and 28. The arm 27 carries a clamp 29 in which the end 12 of the belting can be clamped by means of Allen screws 30. The arm 28 carries a second clamp 31 in which the belting end 13 can be clamped by means of Allen screws 32.

The arms 27 and 28 can be urged towards one another to press the ends 12 and 13 against the element 21, by operation of a first lever 33. The lever 33 and a disc 34 are rotatably mounted on the cross portion 24 of the plate by means of a pivot pin 35. The lever 33 is secured to the disc 34 for rotation therewith by a further pin 36. Pins 37 and 38 on the arms 27 and 28 engage respectively in slots 39 and 40 in the disc 34. The shape and positioning of the slots is such that when the lever 33 is rotated clockwise to turn the disc 34 clockwise, the pins 37 and 38 are urged radially inwardly with respect to the disc, causing the arms 27 and 28 to move towards one another.

When the arms 27 and 28 have been moved towards one another, to press the ends of the belting against the heated element 21, further pressure can be applied, to urge the ends of the belting even harder against the element, by anti-clockwise rotation of a second lever 41. This lever is pivotally connected at 42 to the free end of arm 28. The lever 41 has a ramp-like portion 43 which, when the lever 41 is rotated anti-clockwise, has a camming effect on a pin 44 on the free end of arm 27, urging the arm 27 towards the arm 28.

When the ends of the belting have been arranged in the position shown in FIG. 3, the levers 33 and 41 are operated to force the belting ends with considerable pressure against the hot element 21. It will be seen that the belting end 12 engages with one face of the element while the belting end 13 engages with the opposite face of the element. Each face of the element has a recess 45 which receives the blunt nose 16 or 17 of one of the belting ends thus ensuring that the end face of the nose is melted. Each face of the element is also provided with a rib or projecting portion 46 which bites into the adjacent end of the belting to melt a recess therein.

Figure 4:
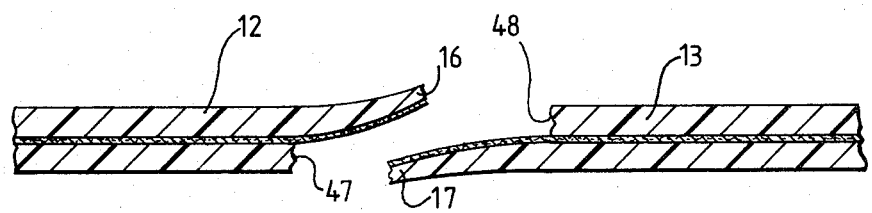
FIG. 4 is a view similar to FIG. 2 but showing the ends of the belting melted immediately prior to joining.

The effect of the element 21 on the ends of the belting is shown diagrammatically in FIG. 4. The blunt nose 16, having been received in one of the recesses 45, is thoroughly melted, as is the blunt nose 17. The projections 46 bite into the ends and form recesses 47 and 48. The flat faces of the element 21 press against the ends of the belting at an angle which is inclined to the longitudinal axis of the belting, causing transverse displacement of the ends of the constraining element with respect to the associated body element. The constraining element of end 12 is displaced upwardly with respect to the associated body element as viewed in FIG. 4, and the constraining element of end 13 is displaced downwardly as viewed in FIG. 4.

It will be appreciated that a certain amount of the body element material is squirted out at the sides of the belting (i.e. the faces marked 49 and 50 in FIG. 1) but since this material does not form part of the joint it is not shown in FIG. 4 in the interests of clarity. It will also be appreciated that the underside of the free end of the constraining element of end 12 as viewed in FIG. 4 and the upperside of the free end of the constraining element of end 13 are not totally exposed, a fine film of melted body element material remaining on these faces.

As soon as the belting ends have been clamped against the heating element and melting has taken place, the lever 41 is moved in a clockwise direction to release the pin 44 and the lever 33 is moved in an anti-clockwise direction to move the belting ends clear of the heated element. The lever 33 is then very rapidly pulled downwardly as viewed in FIG. 3 to slide the plate in the direction of arrow A, moving the ends of the belting clear of the element 21. The lever 33 is then again moved clockwise to bring the arms 27 and 28 towards one another, thus forcing the melted ends of the belting together. The nose 17 is received in the recess 47, and the nose 16 is received in the recess 48. The free ends of the constraining element form an overlapping joint bonded together by the body element material surrounding the constraining element ends and also extending in a thin film 51 between the ends of the constraining element.

Figure 5:
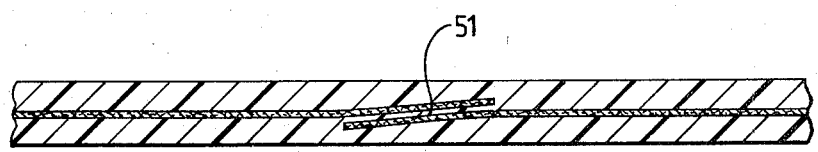
FIG. 5 is a longitudinal cross-section through the finished joint.

Once the joint has solidified, any excess body element material projecting at the sides or other faces of the belt is cut away to leave the finished joint shown in longitudinal cross-section in FIG. 5.

The invention is not restricted to the details of the foregoing embodiment. For instance the described method and apparatus may be used to join together belting having different configurations from that shown in FIG. 1. The invention is applicable to any belting having an elongate body element in which one or more elongate constraining elements are embedded.

Becasue the ends of the or each constraining element form an overlapping joint, the ends remaining totally enveloped in the material of the body element, an exceptionally strong joint is produced and tests have shown that the joint may be as strong as the rest of the belt.

There may be a plurality of constraining elements (e.g. five) formed by a plurality of parallel threads of filaments. Use of the method and apparatus of the above embodiment causes the ends of the threads to overlap and intermingle thereby forming a strong joint.

I claim:

1. A method of forming a joint between adjacent ends of belting, said belting comprising an elongated fusible body element having a predetermined cross-sectional configuration and predetermined cross-sectional dimensions which are uniform throughout the length thereof and an elongated constraining element embedded in said body element throughout substantially the entire length thereof, the method comprising the application of heat and of pressure in a direction transverse to said elongated body element and constraining element to said adjacent ends while maintained in overlapping relationship such that the ends of the body element are fused together, the application of heat and pressure causing the ends of the constraining element to be displaced transversely with respect to their associated body elements, the displacement of one end taking place in the opposite direction to the displacement of the other end so that in the finished joint the ends of the constraining element form an overlapping joint embedded in the fused material of the body element, the cross-sectional configuration and dimensions of said finished joint being substantially the same as said cross-sectional configuration and dimensions of said body element.

2. A method as claimed in claim 1 when used to join together the two ends of a single length of belting to form a continuous belt.

3. A method as claimed in claim 1 or claim 2, in which the adjacent ends of the belting each have heat and pressure applied to them by a hot member, to melt the body element and displace the constraining element transversely in the melted body element, and the two melted ends are then urged together to form the joint.

4. A method as claimed in claim 3, in which the hot member comprises an electrically heated element.

5. A method as claimed in claim 3, in which a face of the hot member engages each end of the belting at an angle inclined to the longitudinal axis of the belting, pressure against the face thus causing the displacement of each constraining element and causing each melted end of the body element to have a tapered configuration so that a scarf joint is formed when said ends are fused together.

6. A method as claimed in claim 5, in which one end of the belting engages one face of the hot member and the other end of the belting engages the opposite face of the hot member.

7. A method as claimed in claim 5, in which, prior to engaging the ends of the belting with the hot member, the ends are cut to a tapered shape to facilitate the formation of tapered melted ends on the body element.

8. A method as claimed in claim 7, in which, prior to engaging the ends of the belting with the hot member, part of each free end of the constraining element is removed to reduce any risk that displacement of the constraining element will cause a free end to be exposed at the surface of the body element in the finished joint.

9. A method as claimed in claim 7, in which the extremity of the tapered shape of each end of the belting is formed into a blunt nose so that when heat is applied there is a sufficient quantity of body element material in this region to fuse to the other end of the belting and prevent the constraining element from being exposed in the finished joint.

10. A method as claimed in claim 9, in which each blunt nose is forced into a recess in said hot member to ensure that the end of each blunt nose is adequately melted.

11. A method as claimed in claim 10, in which the hot member is provided with a projection which forms a melted recess in each end of the body element to receive the melted blunt nose of the other end of the body element.

* * * * *